(12) United States Patent
Kerber

(10) Patent No.: US 11,376,949 B2
(45) Date of Patent: Jul. 5, 2022

(54) CLOSURE DEVICE FOR A FLUID CONTAINER

(71) Applicant: HYDAC FILTERTECHNIK GMBH, Sulzbach/Saar (DE)

(72) Inventor: Michael Kerber, Merzig (DE)

(73) Assignee: HYDAC FILTERTECHNIK GMBH, Sulzbach/Saar (DE)

( * ) Notice: Subject to any disclaimer, the term of this patent is extended or adjusted under 35 U.S.C. 154(b) by 183 days.

(21) Appl. No.: 16/763,273

(22) PCT Filed: Nov. 16, 2018

(86) PCT No.: PCT/EP2018/081495
§ 371 (c)(1),
(2) Date: May 12, 2020

(87) PCT Pub. No.: WO2019/101631
PCT Pub. Date: May 31, 2019

(65) Prior Publication Data
US 2020/0307373 A1 Oct. 1, 2020

(30) Foreign Application Priority Data
Nov. 21, 2017 (DE) ............... 10 2017 010 728.9

(51) Int. Cl.
*B60K 15/05* (2006.01)
*B60K 15/04* (2006.01)
*B60K 15/03* (2006.01)

(52) U.S. Cl.
CPC ......... *B60K 15/0409* (2013.01); *B60K 15/05* (2013.01); *B01D 2279/35* (2013.01);
(Continued)

(58) Field of Classification Search
CPC ............... B60K 15/0409; B60K 15/05; B60K 2015/03434; B60K 2015/0438;
(Continued)

(56) References Cited

U.S. PATENT DOCUMENTS 5,392,816 A * 2/1995 Hagenberg ......... B60K 15/0409
138/89
8,096,438 B2 * 1/2012 Schmalz ............ F02M 25/0854
220/371
(Continued)

FOREIGN PATENT DOCUMENTS

DE          44 12 222      10/1995
DE   10 2008 053 777       4/2010
DE   20 2011 100 846      10/2012

OTHER PUBLICATIONS

Machine Translation of DE102008053777A1; Apr. 29, 2010; all pages (Year: 2010).*
(Continued)

*Primary Examiner* — Nicolas A Arnett
(74) *Attorney, Agent, or Firm* — Wenderoth, Lind & Ponack, L.L.P.

(57) ABSTRACT

A closure device for a fluid container, in particular a hydraulic tank, has a base (4), which can be attached to the container opening and has a cover part (2), which encloses a ventilation and/or a filter device (36). The cover part (2) is held on the base (4) so as to be freely rotatable in a functional unlocking position. In a functional locking position, the closure device permits the container opening to be unlocked by a safety device (48, 50, 58) while connecting the cover part (2) to the base (4). The safety device (48, 50, 58) can be actuated by a magnetic device generating a magnetic field (62). The magnetic device establishes the functional locking position of the cover (2) and the base (4) by magnetic force.

13 Claims, 4 Drawing Sheets

(52) U.S. Cl.
CPC .............. *B60K 2015/03434* (2013.01); *B60K 2015/0438* (2013.01); *B60K 2015/0451* (2013.01); *B60K 2015/0483* (2013.01)

(58) Field of Classification Search
CPC .... B60K 2015/0451; B60K 2015/0483; B01D 2279/35
See application file for complete search history.

(56) References Cited

U.S. PATENT DOCUMENTS

| | | | |
|---|---|---|---|
| 10,035,097 B2* | 7/2018 | Chou | B60K 15/035 |
| 10,940,984 B2* | 3/2021 | Ponticelli, Sr. | E05B 73/0041 |
| 2007/0108212 A1 | 5/2007 | Nelson | |
| 2013/0160503 A1 | 6/2013 | Martinelli et al. | |

OTHER PUBLICATIONS

International Search Report dated Jan. 25, 2019 in International (PCT) Application No. PCT/EP2018/081495.

\* cited by examiner

CLOSURE DEVICE FOR A FLUID CONTAINER

FIELD OF THE INVENTION

The invention relates to a closure device for a fluid container, in particular a hydraulic tank, having a base, which can be attached to the container opening. A cover part encloses a ventilation and/or a filter device and is held on the base so as to be freely rotatable in a functional unlocking position. In a further functional locking position, permits the container opening is unlocked by a safety device while connecting the cover part to the base.

BACKGROUND OF THE INVENTION

Closure devices of this type are state of the art. DE 44 12 222 A1, for instance, discloses a closure device of this type for use on hydraulic tanks in construction machinery or the like. Because construction machines and the like are often left unattended, for instance at night at construction sites, there is a risk that unauthorized persons, for instance inclined towards vandalism, may gain access to the tank or container opening by removing the cover and fill the tank with dirt or other foreign matter in order to damage the construction machine or machine.

As a safety device to counter this problem, the above-mentioned well-known solution provides for the cover to be connected to the base such that it can be rotated continuously and freely. The known solution where the connection can be unlocked actually prevents the base from being unscrewed from the container opening by twisting the cover, i.e. the cover in conjunction with the other mentioned system components remains at the container opening in its protective function.

To permit authorized turning for opening or closing the closure device in the container opening, the known solution provides corresponding recesses on the base and on the cover, which can be aligned by twisting the cover. A pin-shaped tool inserted into the aligned recesses can be used to interconnect the cover and the base for co-rotation to permit the base to be turned clockwise or counterclockwise onto or from the container opening by twisting the cover.

The known solution has several disadvantages. The option of establishing the connection for co-rotation by a pin-shaped tool does not provide sufficient protection against vandalism because pin-shaped objects are generally available and present on construction sites, for example in the form of a nail. To impede unauthorized unlocking, the known solution provides that at least one of the recesses that can be aligned with one another must have a profile that deviates from the shape of a cylindrical drilled hole and that a matching pattern is provided for the tool. On the one hand there is the danger that the special tool will be lost on the construction site. On the other hand there is the danger that the safety system will be overcome by using an unpatterned pin having a sufficiently small diameter, such as a thin nail.

SUMMARY OF THE INVENTION

In view of this issue, the invention addresses the problem of providing a closure device of the type mentioned above, which, while of simple design, offers improved protection against improper intervention (vandalism).

According to the invention, this problem is basically solved by a closure device.

Accordingly, the invention provides that the essential difference from the prior art is that the safety device can be actuated by a device generating a magnetic field. That device establishes the further locked functional position of the cover and the base by a magnetic force. The actuation of the safety device using the magnetic force eliminates the disadvantages and safety risks present in the state of the art due to the potential of unauthorized actuation successfully performed by tools without coding, for example by replacing a patterned pin-shaped tool intended for authorized actuation by a simple means, for instance a thin nail.

In advantageous exemplary embodiments, the safety device has a locking part which, unlocked in one functional position, is displaceably guided in a holder in the base and, in the further functional position, under the action of the magnetic force, at least partially moves out of the holder into locking engagement with an assignable holder in the cover part. If the locking part is of a ferromagnetic material, it can be moved directly by the magnetic force.

With particular advantage, the arrangement can be such that the holder, placed on the cover part from the outside, moves the locking part from one functional position to the other functional position.

In the case of particularly advantageous exemplary embodiments, in which the locking part is guided so as to be movable at least approximately in the vertical direction in the normal installation position of the closure device, the locking part moves from the further locked functional position to the unlocked functional position due to gravity, without any magnetic force applied by the device generating a magnetic field. This safety device is characterized by a particularly simple design.

The arrangement can be particularly advantageous in that the locking part is formed by a metallic locking pin. The holders of the locking pin are formed by cylindrical guides, which can be brought into alignment with one another. The magnetic field-generating device is formed by a permanent magnet.

The safety device can be designed with particular advantage in such a way that in the locked state, in which the cover part and base are connected to each other at least for co-rotation, the base can be screwed into a filler neck or extraction port of the fluid container by a screw-on movement of the cover part. The base can be unscrewed from the connection piece in the opposite direction of rotation of the cover part in an unscrewing motion while unlocking the container opening.

The actuation of the safety device is particularly simple and convenient if the permanent magnet can be placed on or along a marking on the cover part.

Advantageously, the marking on the cover part can be arranged in such a way that the marking on the cover part forms a mount for the permanent magnet. The magnet is preferably designed as a magnetic ring. The mount can have the form of a projection at the cover part, which engages with the ring opening of the magnetic ring.

In advantageous exemplary embodiments, the cover part extends over the base from the outside in such a way that the cover end merges into the threaded engagement of the base in the socket essentially without gap. In that way tools cannot act on the base.

In this way, in the case of a freely rotatable cover part, the risk of the base being unscrewed by tool action at the base is averted, because there is insufficient clearance for the insertion of a tool, such as an open-ended wrench, between the base and the connection piece of the fluid container.

The base can advantageously be designed in such a way that it also accommodates the ventilation and filter devices. Preferably, the opening connecting the ventilation device to the outside is located at the bottom of the base, and thus, in an area protected against the ingress of splashed water or the like.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
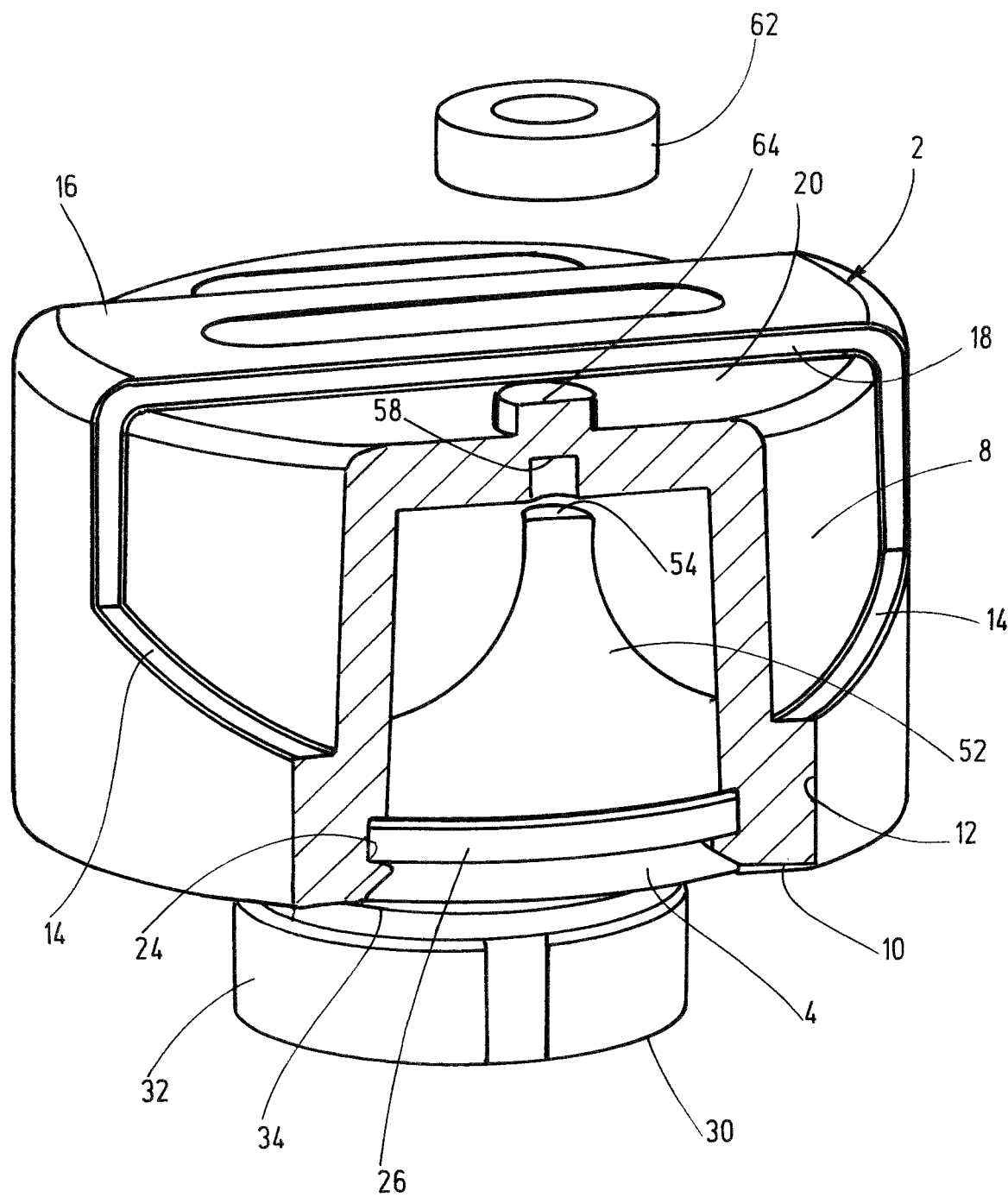
FIG. 1 is a perspective view partially in section of a closure device according to an exemplary embodiment of the invention, drawn approximately 1½ times enlarged compared to a practical exemplary embodiment, wherein a partial area of a side wall of the cover part is vertically cut away and the safety device is shown in the functional unlocking position.
Figure 3:
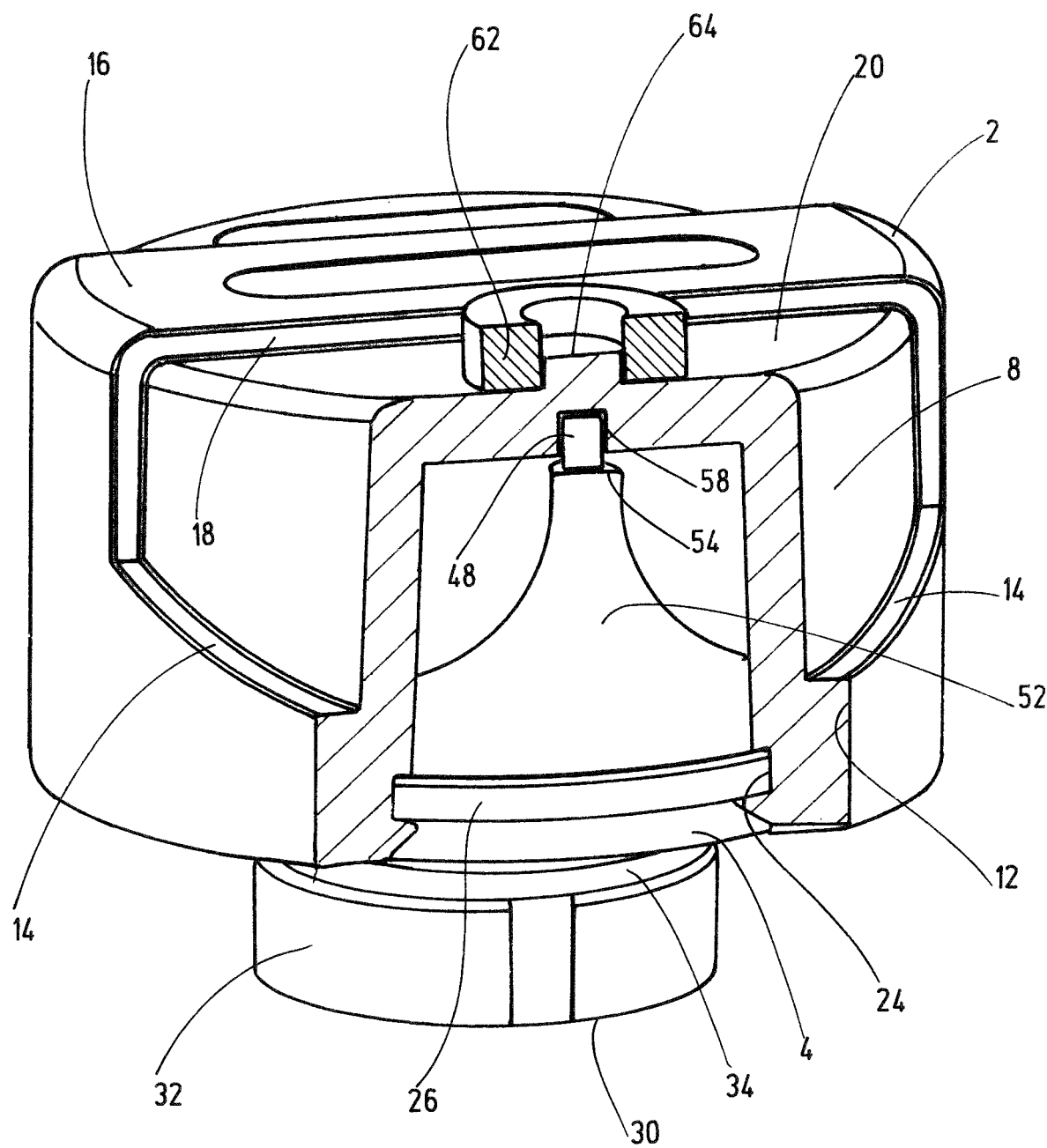
FIG. 3 is a perspective view in partial section of the closure device of FIG. 1, wherein the functional locking position of the safety device is shown.

The exemplary embodiment of the closure device shown in the figures has a first main housing part in the form of a cover part 2 and a second main housing part in the form of a base 4. The cover part 2 and the base 4 are each integrally injection molded from a plastic material, such as a glass-fiber reinforced polyamide. The cover part 2 has the shape of a hood having a circular cylindrical side wall 8 concentric to a vertical axis 6, which has a wall thickening 12 adjoining the lower opening rim 10. As FIGS. 1 and 3 show, the wall thickening 12 runs or extends upwards having arcuately curved inclined surfaces 14 and merges into a strip 16 having straight side edges 18 at approximately half the height of the cover part 2. The strip 16 extends over the entire width of a circular cover surface 20 of the cover part 2, projecting thereover. Due to the inclined surfaces 14 of the wall thickening 12 protruding from the cylinder surface of the side wall 8 and the adjoining protruding strip 16, the outer contour of the cover part 2 is non-circular. In this way the outer contour forms grip surfaces that provide for convenient manual twisting the cover part 2 to facilitate manual screwing or unscrewing of the closure device onto or from a filler neck (not shown) of a fluid container.

The base 4 and a circular disk 22 form the lower end of the interior of the hood of the cover part 2 at the opening rim 10 of the cover part 2. For connecting the cover part 2 to the base 4, the cover part 2 has a radially recessed annular groove 24 extending along the entire circumference on the inside near the opening rim 10. The groove is connected to an annular body 26 projecting radially from the base 4 by clipping. The engagement of the annular body 26 with the annular groove 24 not only secures in the axial direction, but also forms a rotary bearing, by which the cover part 2 can be freely rotated on the base 4. The circular disk 22 of the base 4 has a coaxial passage 28, which merges into a screw-in body 30. Body 30 protrudes axially downwards and has a male thread 32 for forming the screw connection with the filler neck concerned, which filler neck is not shown. Because the opening rim 10 of the cover part 2 extends over the circular disk 22 of the base 4, there is essentially no or only a small space between the base 4 and the filler neck if the screw-in body is screwed into the filler neck (not shown). The seal is formed by a sealing ring 34, i.e. there is no clearance to insert a tool, such as an open-ended wrench, which could be used to twist the base 4 without authorization.

A ventilation filter 36 is installed between the top of the circular disk 22 of the base 4 and the inside of the cover surface 20 of the cover part 2. It has, as usual, a hollow cylindrical filter medium 38, which is arranged between the end caps 40 and 42. On the inside of the filter medium 38, there is a fluid-permeable support structure 44, which surrounds the inner filter cavity, which is connected to the passage 28 of the screw-in body 30. The space on the outside of the filter medium 38 is connected to the ambient atmosphere by a ventilation passage 46 formed in the circular disk 22 of the base 4 and open to the atmosphere on the underside of the circular disk 22. This location of ventilation passage 46 protects the mouth of passage 46 against splash water or dirt from above.

A safety device, by which the cover part 2 and the base 4 can be locked against relative rotation, has a locking pin 48. Locking pin 48 is freely displaceably guided in a drilled hole 50, which extends axially in parallel to the vertical axis 6. The drilled hole 50 is located in an extension 52, which, in an upwardly tapering form, extends upwards from an outer rim area of the circular disk 22 of the base 4 along the side wall 8 of the cover part 2. The upper end 54 of the extension 52 ends immediately below an inner ring 56, which surrounds the upper end cap 40 of the filter 36 on the underside of the cover surface 20.

Figure 4:
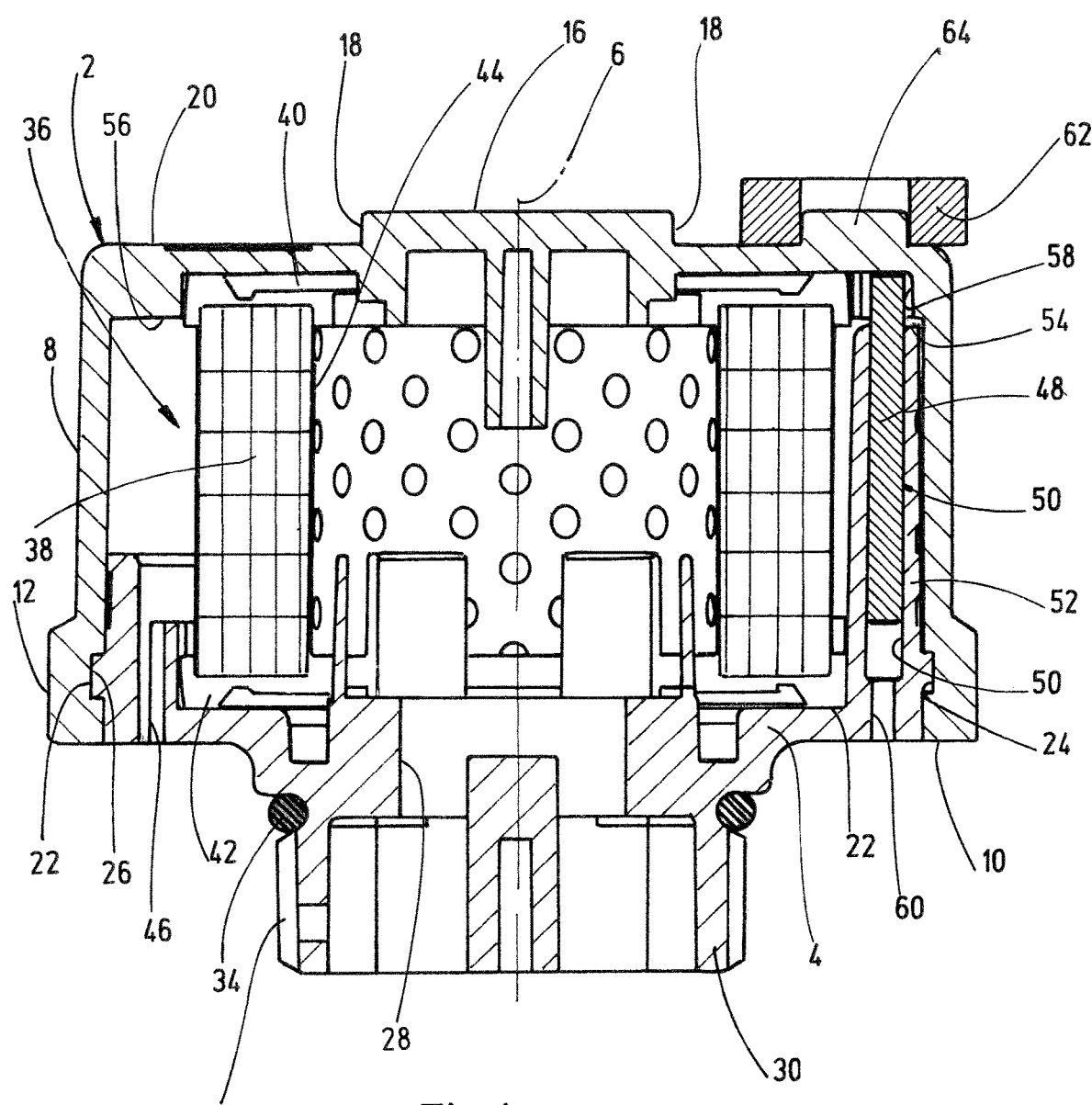
FIG. 4 is a side view in section of the exemplary embodiment, wherein the functional locking position of the safety device is shown.

In a position that is located at the greatest distance from a side edge 18 of the strip 16 of the cover part 20, there is a circular cylindrical recess 58 on the underside of the inner ring 56. Recess 58 forms the holder for the end of the locking pin 48 when the locking pin 48 has moved from the position shown in FIG. 2, which corresponds to the functional unlocking position, to the position shown in FIGS. 3 and 4, which corresponds to the functional locking position. The ferromagnetic locking pin 48 is guided freely and axially mobile in the drilled hole 50, which has an end section 60 open to the underside and tapered in diameter, i.e., the pin 48 can be moved upwards from the position shown in FIG. 2 by a magnetic force acting on the top of the cover part 2.

When the cover part 2 is twisted to a rotated position, in which the recess 58 in the inner ring 56 is aligned with the drilled hole 50, the locking pin 48 engages with the recess 58 upon action of the magnetic force and forms the twist lock between cover part 2 and base 4. A magnetic field generator or magnetic ring 62 is provided as a holder, which, for the locking process, can be placed on the top of the cover surface 20 of cover part 2. A circular cylindrical projection 64, which engages in the ring opening of the mounted magnetic ring 62, is provided on the cover surface 20 as a mark for mounting the magnetic ring 62.

Figure 2:
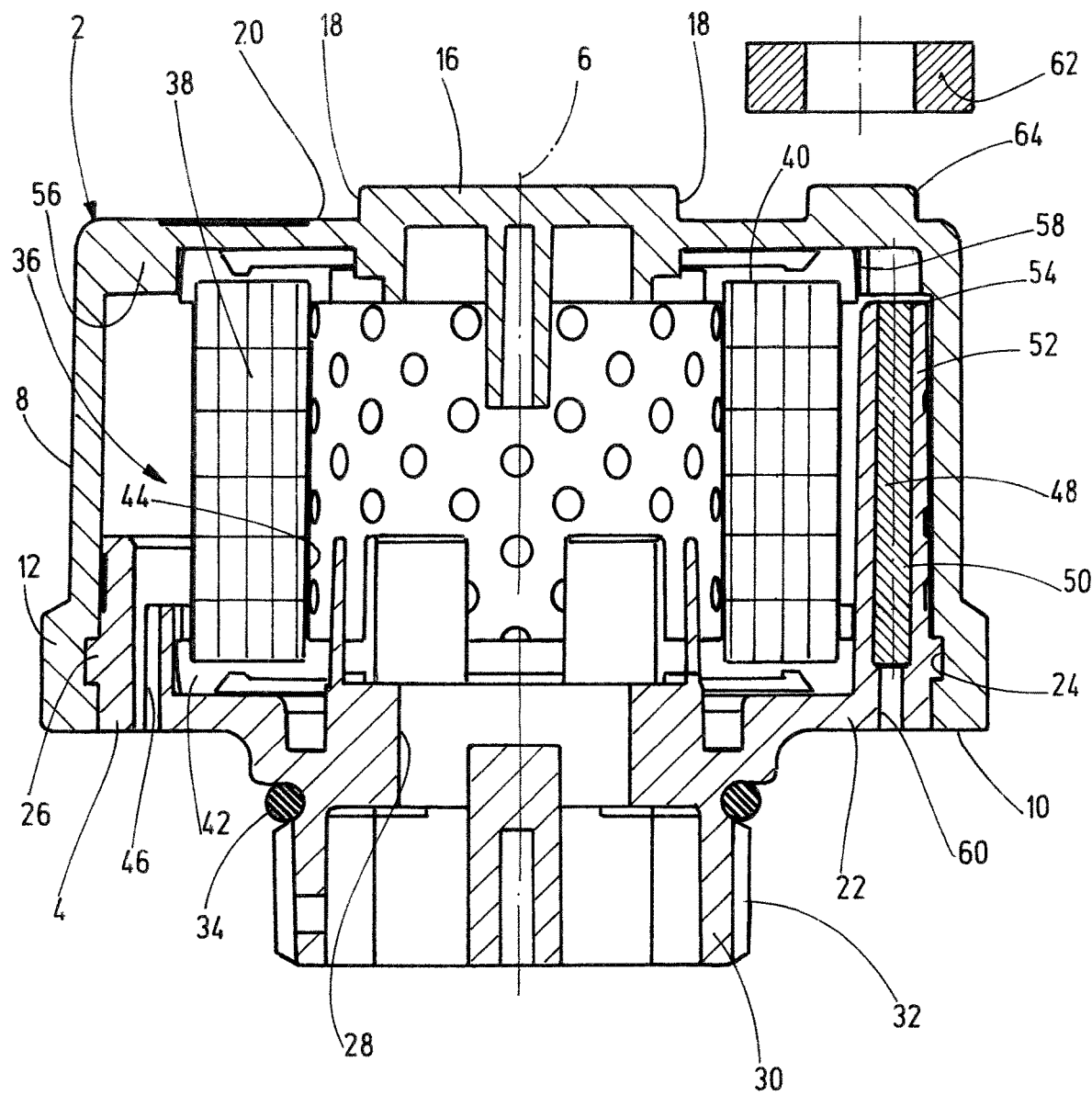
FIG. 2 is a side view in section of the exemplary embodiment having a section plane perpendicular to the section plane of FIG. 1, wherein the functional unlocking position of the safety device is shown.

When the magnetic ring 62 is fitted and the twist lock is effective, the closure device can be screwed into or unscrewed from the filler neck (not shown) of the fluid container concerned by turning the cover part 2. When the magnetic ring 62 is removed from the cover surface 20, as shown in FIGS. 1 and 2, the locking pin 48 moves downwards in the drilled hole 50 due to the effect of gravity into the unlocking position shown in FIGS. 1 and 2. In that unlocking position the cover part 2 can be freely rotated relative to the base 4 preventing an unauthorized unscrewing of the closure device.

While one embodiment has been chosen to illustrate the invention, it will be understood by those skilled in the art that various changes and modifications can be made therein without departing from the scope of the invention as defined in the claims.

The invention claimed is:

1. A closure device for a fluid container, the closure device comprising:
    a base being attachable to the container opening of the fluid container and having an annular body projecting radially outwardly from the base;
    a cover part being capable of enclosing at least one of a vent or a filter and being held on the base so as to be freely rotatable relative to the base in a functional unlocking position of the cover part and the base and to be locked for simultaneous rotation of the cover part and the base in a functional locking positon of the cover part and the base, the cover part having an annular groove being radially recessed and extending along an entire inner circumference of the cover part near an opening rim of the cover part, the annular groove receiving the annular body allowing relative rotation and preventing relative axial movement of the base and the cover part; and
    a safety device connecting the cover part and the base in the functional locking positon by a magnet force of a magnetic field generator moving the safety device to the functional locking position.

2. A closure device according to claim 1 wherein
    the safety device comprises a locking part displaceably guided for movement in a base holder in the base that unlocks the cover part and the base in the functional unlocking position and locks the cover part and the base in the functional locking position by moving out of the base holder into locking engagement with a cover holder in the cover part by the magnetic force.

3. A closure device according to claim 2 wherein
    the magnetic field generator moves the locking part from the functional unlocking position to the functional locking position when the magnet field generator is placed on the cover part from outside the cover part.

4. A closure device according to claim 3 wherein
    the locking part is movable by gravity in the base holder from the functional locking position to the functional unlocking position without the magnetic force of the magnetic field generator being applied to the locking part.

5. A closure device according to claim 2 wherein
    the locking part comprises a metallic locking pin;
    the base holder and the cover holder comprise cylindrical guides capable of being axially aligned with one another; and
    the magnetic field generator comprises a permanent magnet.

6. A closure device according to claim 5 wherein
    a marking is on the cover part, the permanent magnet being placeable on or along the marking.

7. A closure device according to claim 6 wherein
    the marking forms a mount for the permanent magnet.

8. A closure device according to claim 7 wherein
    the permanent magnet comprises a magnetic ring.

9. A closure device according to claim 8 wherein
    the marking comprises a projection on an outside surface of the cover part, the projection being received in an opening of the magnetic ring.

10. A closure device according to claim 1 wherein
    the base is capable of being screwed into and unscrewed from at least one of a filter cap or an extraction port of the fluid container by rotation of the cover part in opposite first and second rotational directions, respectively, when the cover part and the base are in the functional locking position.

11. A closure device according to claim 1 wherein
    the cover part extends over an outside of the base and has a cover end merging into a thread on the base essentially without a gap, whereby tool cannot act on the base when threadedly engaged with the container opening.

12. A closure device according to claim 1 wherein
    the base receives the vent and the filter.

13. A closure device according to claim 1 wherein
    an annular groove and the annular body are concentric about an axis of rotation of the base and the cover part, the safety device being spaced radially from the rotational axis.

* * * * *